United States Patent
Thomson et al.

(10) Patent No.: US 10,805,461 B2
(45) Date of Patent: Oct. 13, 2020

(54) ADAPTIVE THRESHOLDING

(71) Applicant: Avaya Inc., Basking Ridge, NJ (US)

(72) Inventors: Rodney A. Thomson, Westminster, CO (US); Brian J. Reynolds, Firestone, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/840,773

(22) Filed: Mar. 15, 2013

(65) Prior Publication Data
US 2014/0270136 A1    Sep. 18, 2014

(51) Int. Cl.
*H04M 3/00* (2006.01)
*H04M 3/51* (2006.01)
*H04M 3/523* (2006.01)

(52) U.S. Cl.
CPC ........... *H04M 3/51* (2013.01); *H04M 3/5234* (2013.01); *H04M 2201/18* (2013.01); *H04M 2203/402* (2013.01)

(58) Field of Classification Search
CPC .. G06Q 30/20; H04M 3/5175; H04M 3/5232; H04M 3/51; H04M 5/5232; H04M 3/5233
USPC ........................................ 379/265.03, 265.06
See application file for complete search history.

(56) References Cited

U.S. PATENT DOCUMENTS

| | | | |
|---|---|---|---|
| 5,940,494 A * | 8/1999 | Rafacz et al. | 379/265.03 |
| 5,978,465 A * | 11/1999 | Corduroy et al. | 379/265.02 |
| 6,741,698 B1 * | 5/2004 | Jensen | H04M 3/5233 |
| | | | 379/265.02 |
| 6,748,072 B1 * | 6/2004 | McGraw et al. | 379/265.03 |
| 7,398,224 B2 * | 7/2008 | Cooper | 705/7.37 |
| 2005/0138111 A1 * | 6/2005 | Aton et al. | 709/201 |
| 2007/0025528 A1 * | 2/2007 | Knott et al. | 379/32.01 |
| 2007/0198329 A1 * | 8/2007 | Lyerly | G06Q 10/00 |
| | | | 705/7.16 |
| 2008/0019500 A1 * | 1/2008 | Torres | H04M 3/5237 |
| | | | 379/265.02 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2011/0295644 A1 * | 12/2011 | Hara | G06Q 10/06315 |
| | | | 705/7.25 |
| 2013/0022194 A1 * | 1/2013 | Flockhart et al. | 379/265.06 |

* cited by examiner

*Primary Examiner* — Rasha S Al Aubaidi
(74) *Attorney, Agent, or Firm* — Sheridan Ross P.C.

(57) ABSTRACT

The present disclosure is directed to methods for determining an adaptive threshold, including specifying a variable, where the variable comprises a real-time state of a contact center; specifying a threshold, where the threshold is related to the variable; monitoring the variable; and adjusting the threshold in relation to a change in the variable.

18 Claims, 2 Drawing Sheets

ADAPTIVE THRESHOLDING

FIELD OF THE DISCLOSURE

The present disclosure is generally directed toward communications and more specifically toward contact centers.

BACKGROUND

Contact centers can provide numerous services to customers, and have been doing so for years. The idea of a contact center queue is not much different from that of standing in line at a bank and waiting to be helped by the next available teller. However, there can be a lot of frustration if the first, second, or even third teller cannot answer a given question or set of questions. The same frustrations have been known to occur in contact centers. A company can gain customer satisfaction if they are able to answer their customers' questions quickly and accurately.

Contact centers (also referred to as call centers), such as Automatic Call Distribution (ACD) systems, are employed by many enterprises to service customer contacts (also referred to as calls or customers). A typical contact center includes a switch and/or server to receive and route incoming packet-switched and/or circuit-switched contacts and one or more resources, such as human agents and automated resources (e.g., Interactive Voice Response (IVR) units), to service the incoming contacts.

Contact centers use thresholds typically to report data. For example, contact centers may monitor variables (such as talk time, wait time, and after call work time, among others) for limits that, when exceeded, are reported upon.

SUMMARY

However, thresholds in use at contact center today are generally static in nature. In other words, currently used thresholds do not account dynamically for changes occurring in real-time. This is problematic because static contact center thresholds do not account for changing real-time call center properties, for example. Even thresholds that are conditionally set (e.g., changing a threshold when a certain condition is met (such as time value(s), other threshold values, historical data, baseline values, etc.)) do not account for automatic adjustment of thresholds based on real-time data. It is with respect to the above issues and other problems that the embodiments presented herein were contemplated.

The present disclosure is directed to methods for determining an adaptive threshold, including: specifying a variable, where the variable comprises a real-time state of a contact center; specifying a threshold, where the threshold is related to the variable; monitoring the variable; and adjusting the threshold in relation to a change in the variable.

The present disclosure is further directed to systems, including: a contact center, and a processor configured to: specify a variable, where the variable comprises a real-time state of a contact center; specify a threshold, where the threshold is related to the variable; monitor the variable; and adjust the threshold in relation to a change in the variable.

It should be appreciated that the present disclosure outlines utilizing multiple selection mechanisms together to assign work items on a system-wide improved basis. By merging selection mechanisms, a work item may be assigned according to the improved solution for the work item, which may be a suboptimal solution for a given contact center. Among other things, the present disclosure provides methods, devices, and systems to overcome the limitations of current contact centers that cannot merge selection mechanisms in assigning work items inside and/or outside of a contact center.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
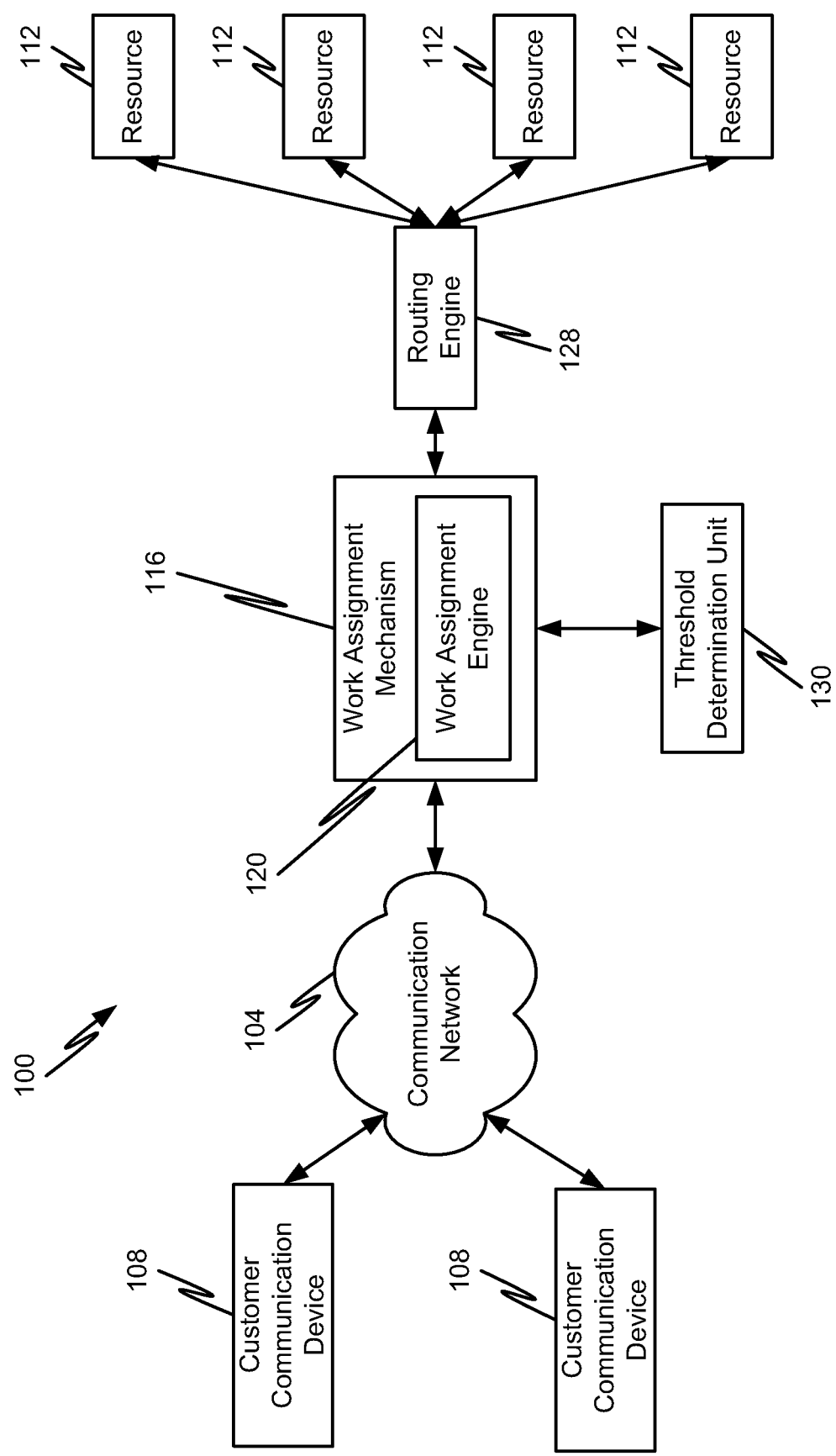
FIG. 1 is a block diagram of a communication system in accordance with some embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 and a work assignment mechanism 116, which may be owned and operated by an enterprise administering a contact center in which a plurality of resources 112 are distributed to handle incoming work items (in the form of contacts) from the customer communication devices 108. A threshold determination unit 130 is connected to the work assignment mechanism 116.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116).

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128, which may share information with the threshold determination unit to make decisions regarding work items. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers, and may include contact centers.

The work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 and/or work assignment engine 120 have capabilities that enable them to make intelligent routing decisions for work items. In various embodiments, the work assignment mechanism 116 and/or work assignment engine 120 make intelligent routing decisions for work items in conjunction with the threshold determination unit 130, as described herein. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is eligible and/or qualified to receive a work item and further determine which of the plurality of processing resources 112 is best suited to handle the processing needs of the work item. The work assignment engine 120 can make such decisions using information from the threshold determination unit 130, and can provide information, including real-time data) to the threshold determination unit 130. In situations of work item surplus, the work assignment engine 120 can also make the opposite determination (i.e., determine improved assignment of a work item to a resource). In some embodiments, the work assignment engine 120 is configured to achieve true one-to-one matching.

The threshold determination unit 130 processes information associated with dynamic thresholds related to the communication system 100. In embodiments, the threshold determination unit 130 uses variables to relate to the thresholds. A variable is a parameter that is associated with communication system 100, and is related to real-time information. A variable is a parameter describing resources or work items, for example.

The threshold determination unit 130 may receive variables regarding aspects of the communication system 100 related to work items, the work assignment mechanism 116, resources 112, and the communication network 104, among others. A variable may include performance measures, which may be related to any statistical data regarding the contact center. For example, the performance measures may be statistical information related to a specific queue and/or skill (such as measures related to abandoned calls, cancelled calls, and busy signals, among others), or agent data (such as measures related to agent activity, e.g., states or events)) related to a contact center. Additional examples of performance measures include any type of known Key Performance Indicator (KPI) monitored and/or tracked in a contact center. Non-limiting examples of contact center KPIs include occupancy (e.g., expressed as a percentage, which may help identify how much time an agent is actually "speaking live" to customers, where a higher percentage may be more desirable), abandoned calls, percentage abandoned, calls answered, calls offered, Average Wait Time (AWT), grade of service (e.g., number of calls answered within x seconds), conversion, average call length, first call resolution (as a percentage), customer call frequency, average age of query, combinations thereof, and the like.

In various embodiments, decisions regarding aspects of work items may be made based on information from the threshold determination unit 130. The threshold determination unit 130 may use variables to determine and adjust thresholds. A threshold may be based on a variable, where the threshold is a rule based on any objective. For example, a threshold may be a desired percent service level. Also, a threshold may be a rule related to an if then scenario. For example, if a performance measure reaches a certain value, then an alert will be sent. As another example, if the wait time is undesirably high (e.g., reaches a certain value) the criteria for first call resolution may be loosened (e.g., dropped to 60% from 80%). A further example is that if the average wait time reaches its first threshold, then the threshold for average handle time may be reduced thereby encouraging agents to finish calls faster (e.g., the average. handle time threshold may be reduced from 5 minutes to 4 minutes). Thus, when agents shorten their talk time with customers the wait time would thereby be improved (e.g., reduced RTI).

In embodiments, notifications and/or alerts may be sent, such as an agent may be notified that the second threshold is adjusted based on the change in the first threshold. Also, an agent may be notified as to their current status in relation to any thresholds. For example, if a number of abandons within the last fifteen minutes exceeded the 3% threshold, such a value may mean that the contact center is losing too many calls and the average wait time may be undesirably high. However, the number of abandons may or may not reach its threshold. Or, either the abandon rate or average wait time may reach a threshold. An alert to agents and/or supervisors can be sent out notifying them that they are losing customer calls and that they need to speed up handling customer calls to reduce the number of calls lost. At the same time, a real-time threshold for agent handle time can be reduced from five minutes to four minutes. Also, as the agent is handling a call, their handle time can be conditionally formatted to yellow, for example, if the call exceeds four minutes. In addition, a second threshold may be updated to five minutes, and if the agent continues the call then the handle time can go to red (for example) for exceeding the second threshold.

As another example, for combined variables, various embodiments may consider percent in service level and abandon rate combined to determine when to tighten (e.g., shorten) the handle time threshold. Alternatively, as an average wait time or abandon rate goes back below its threshold then the reverse happens (e.g., the handle time threshold may be increased). Agents and supervisors may be notified that thresholds have been restored to normal. In addition, agent metrics may then reflect the original thresholds where conditional formatting is based on exceeding five minutes for the first threshold and x minutes (e.g., six minutes) for the second threshold.

Variables can be abandons, abandon rate, average (avg) wait time, number of calls waiting, busies (implying that the contact center ran out of physical resources to deliver calls), and percent in service level, among others. Thus, for certain variables, such as customer satisfaction or first call resolution variables, handle time may be loosened (e.g., increased) in order to increase time spent with customers.

Thus, the methods and systems of the present disclosure may advantageously allow for dynamic thresholds that account for real-time changes in variables and/or thresholds and thereby allow for adaptive thresholding.

The threshold determination unit 130 may be configured to specify a threshold based on one or more variable, and adjust the threshold based on changes that occur to the variable in real-time. In addition, the threshold determination unit may use multiple variables, where any one or more of the variables may be based on other variables or thresholds. The threshold determination unit 130 may further be configured to perform an action in response to the threshold; for example, notifying a resource of threshold status or recording and/or reporting information associated with the threshold determination unit 130. Such actions may be automated.

In illustrative embodiments, the threshold determination unit 130 may operate in the following manner. For example, if an expected wait time exceeds a threshold value, the work assignment mechanism 116 may assign a specific resource 112 to the associated call to facilitate the processing of calls of that type. In some embodiments, the allocation or reallocation of resources 112 to call types may be performed each time a threshold value is calculated. By providing an additional resource (e.g., another agent) to handle calls for the call type, the expected wait times for queued calls within the call type may be reduced. In other words, if a threshold is reached, an administrative action may assign additional resources to expand the agent pool by specifying individual agents, a group of agents, or even allow calls to be queued to another queue/skill. Such illustrative actions may change administration associated with a routing point (e.g., vector directory number or vector variables). These administrative changes may change routing logic while thresholds are exceeded. It should be appreciated that multiple thresholds can be maintained and dynamically adjusted for one or more of the variables in the call center in accordance with the present disclosure.

In accordance with the present disclosure, a threshold may be used by the work assignment mechanism 116 to allocate a resource 112 to a call type, where the threshold is a dynamically varying amount based on real-time information. That is, a threshold may be repeatedly modified during system operation (e.g., when a call center variable changes in real-time). In addition, for example, the threshold for a call type may be varied based on the proportion of a target service level for the call type that is being met by the call center in real-time. The threshold determination unit 130 may receive real-time data regarding a service level being provided for each of the call types, where the threshold changes based on whether the service level is meeting certain requirements. The threshold determination unit 130 may dynamically generate a threshold for the call type based on whether the service level is meeting certain requirements for real-time data. Thus, the threshold is changed based on real-time data if the service level target for the skill is not being achieved.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

For example, the work assignment mechanism 116 and/or the work assignment engine 120 may apply various algorithms to a received work item in determining a work assignment. Additionally, the work assignment mechanism 116 and/or the work assignment engine 120 may refer to various rules in determining a work assignment. As can be appreciated, the comparison of results related to resources 112, and/or contact center, or site, may be subject to stored rules. It is anticipated that these stored rules may determine first call resolution, priority, wait time arrangement, and the like. Once an appropriate work assignment is determined by the work assignment mechanism 116 and/or the work assignment engine 120, the routing engine may route the work item to the determined resource 112. As can be appreciated, routing provided by the routing engine 128 may be affected by direction provided by at least one of the work assignment mechanism 116 and the work assignment engine 120. This direction may include input relative to resource 112 type, group type, customer identification, and the like.

In some embodiments, the work assignment mechanism 116 and/or the work assignment engine 120 may determine that an improved work assignment of a work item is to route the work item from a first contact center to another contact center. In some instances, the work item may be routed to a contact center outside of the first contact center's enterprise. This type of routing is at least one example of outsourcing. Whether the work item is outsourced (inside or outside of an existing enterprise) the work assignment mechanism 116 and/or the work assignment engine 120 may determine that the work item should be managed by another work assignment mechanism related to the outsourced resource 112.

As can be appreciated, the work assignment mechanism 116 and/or the work assignment engine 120 may add information to a work item to indicate a number of work assignment related data. This data may be maintained in a bitmap, table, or other digital form of memory that is associated with the work item. The data may include, but is not limited to, variables related to the contact center, thresholds, selection mechanisms used in work assignment processing, further processing required (including work assignment, routing, etc), time in work assignment (e.g., cumulative time or per work assignment mechanism 116 time), source resource, destination resource, and other work assignment related information.

Figure 2:
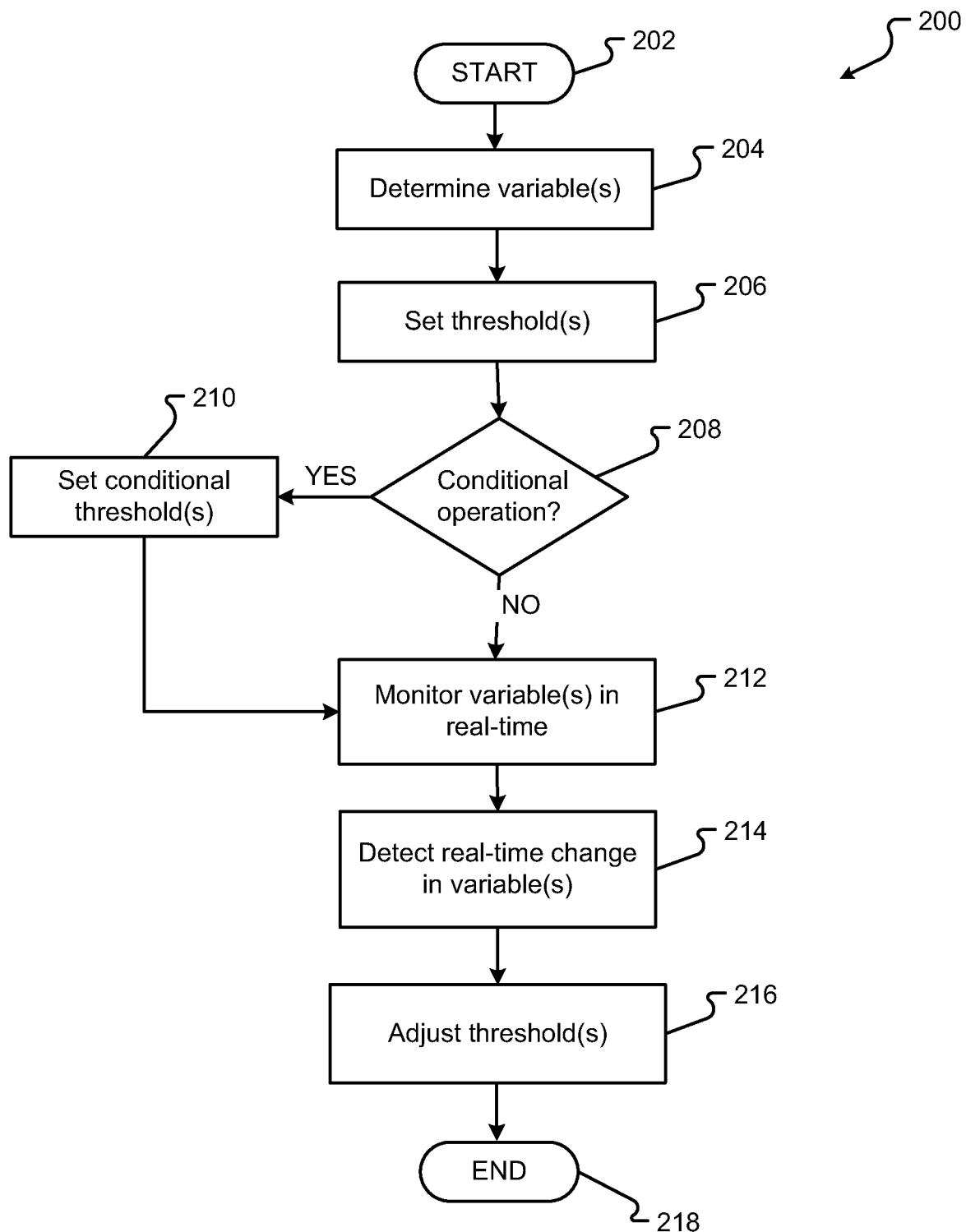
FIG. 2 is a flow diagram depicting methods in accordance with some embodiments of the present disclosure.

Referring now to FIG. 2, a flow diagram 200 depicting methods in accordance with embodiments of the present disclosure will be described. FIG. 2 starts at step 202. In step 204, one or more variables for the contact center are determined. In embodiments, the variable may be a variable related to real-time data. As discussed above, variables may be inputs to key performance indicators or key performance indicators themselves, such as average talk time or percent in service level for various resources, such as agents, queues, skills, routing points, and auxiliary states, for example.

In step 206, one or more thresholds are set. The threshold may be set by an entity, where the entity may be associated with the contact center and may be an agent, a supervisor, a director, a site manager, or an administrator, among others, and the thresholds may be predefined, for example. The threshold is related to the variable that was determined in step 204. A single threshold may be related to multiple variables, or multiple thresholds may be related to multiple variables, and vice versa. Thus, the threshold depends on real-time data.

In step 208, it is determined whether a conditional threshold is desired? If yes, the process sets one or more conditional threshold in step 210. For example, an administrator may conditionally set a threshold for a variable (e.g., a KPI) based on the value of another variable (e.g., KPI). In particular, from an agent perspective, a threshold may apply to talk/handle time so the agent can see in real-time that they are exceeding the goal. Thus, the average talk time would thereby be adjusted as the overall agent talk time is reduced. For example, a threshold may be set for an average talk time of five minutes for when the percent in service level is greater than 87%, and to four minutes when percent in service level is greater than 75% and less than 87%, and to three minutes when the percent in service level is 75% or lower. Alternatively, the average talk time threshold may be set based on percent in service level exceeding its first level threshold or second level threshold. Advantageously, this provides for thresholds based on real-time variables (e.g., the current value of the variable is monitored) because the status of the variables is monitored in real-time, in interval measures, or in start of day measures. In contrast, historical thresholds are typically tied to static or default values.

In addition, in step 210, the conditional threshold for a variable can be based on a calculation or a combination of variables, where the combination of variables is obtained by a calculation. Further, the conditional threshold can be based on the threshold status of another variable.

Referring again to step 208, if no conditional operation is desired, or if the conditional threshold(s) are set in step 210, the process continues to step 212, where the one or more variable is monitored in real-time. In step 214, any real-time change is detected in the one or more variables, and such a change may be used to adjust the one or more threshold in step 216. For example, if the variable being monitored is the real-time percentage state in service, and a threshold is set to alert a supervisor and adjust to a different value when the percentage state in service reaches a specific value, when the variable reaches the specified percentage in real-time, the system will alert the supervisor and adjust to the different value. In particular, if the threshold is a percentage of 80% for the percentage state in service, and the different value is 85%, when the percentage state in service reaches 80% in real-time, the threshold will alert the supervisor and set itself to alert the supervisor again when the percentage state in service reaches 85%.

Thus, by having variable based conditional thresholds, agents can be alerted as to their current targets and supervisors can be alerted as well (e.g., by conditional formatting, audio alert, and SMS/text, among others), so that when agents exceed the threshold, which is reflective of the real-time contact center (e.g., queue/skill, routing point) status. The contact center may adjust its behavior (e.g., agents and supervisors may adjust their behaviors) based on the real-time status of the contact center, or the real-time status of an individual queue and/or skill, routing point, etc.

Still further, data related to the threshold(s) may be recorded and/or reported in any sequence. For example, it may be recorded and reported simultaneously, or sequentially. Further, the contact center may adjust its behavior based on the data, which may be analyzed. The analyzed data may be presented and/or reported in various formats. The data may be analyzed to determine underperforming or over-performing resources. The data analysis may be presented and used in various ways. It may be monitored for possible future use. It may be used to make managerial decisions about staffing. It may be used to find well performing agents, queues, or contact centers, and determine what attributes may be enabling the agents, queues, or contact centers to outperform those at other locations.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:
1. A method, comprising:
   specifying, by a microprocessor, a real-time value that changes in real-time such that the real-time value represents real-time data related to an entity of a contact center;

specifying and storing, by the microprocessor, a first threshold, wherein the first threshold is related to the real-time value;

monitoring, by the microprocessor, the real-time value;

automatically adjusting, by the microprocessor, the first threshold in relation to a change in the real-time value, specifying and storing, by the microprocessor, a second threshold that is related to the automatic adjustment by the microprocessor of the first threshold, and performing an action within the contact center based on the second threshold, wherein the action comprises at least one of automatically notifying a resource, invoking a recording function, and invoking a reporting function.

2. The method of claim 1, wherein the microprocessor bases an amount of the automatic adjustment of the first threshold on the entity, and wherein the entity is one of an agent, a queue, and a skill.

3. The method of claim 2, further comprising:

specifying, by the microprocessor, a second value, wherein the second value is related to the real-time value, wherein the second value is represents real-time data related to another one of the agent, the queue, and the skill, and wherein the automatic adjustment of the first threshold, by the microprocessor, is related to the second value.

4. The method of claim 2, further comprising:

performing, by the microprocessor, an action in response to the automatic adjustment of the first threshold, wherein the entity is the agent, and wherein the action comprises the microprocessor notifying the agent of the amount of the automatic adjustment.

5. The method of claim 4, wherein the notification is automated and at about a same time as the automatic notification, the microprocessor notifies the agent of a current status of the agent in relation to the automatic adjustment of the first threshold.

6. The method of claim 2, further comprising:

performing, by the microprocessor, an action in response to the automatic adjustment of the first threshold, wherein the entity is the agent, and wherein the action comprises the microprocessor notifying a supervisor of the agent of a performance of the agent in relation to the automatic adjustment by the microprocessor of the first threshold.

7. The method of claim 1, further comprising:

initiating, by the microprocessor, an action in response to the automatic adjustment by the microprocessor of the first threshold, wherein the action comprises a change to the behavior of the contact center.

8. The method of claim 1, further comprising:

recording, by the microprocessor, the automatic adjustment to the first threshold to obtain recorded data; and analyzing, by the microprocessor, the recorded data to determine if the entity is underperforming or overperforming.

9. The method of claim 8, further comprising:

reporting, by the microprocessor and to a supervisor of the entity, the recorded data and the analysis of the recorded data.

10. A computational system, comprising:

a microprocessor and a computer-readable medium coupled thereto and storing instructions, wherein instructions program the microprocessor to:

specify a real-time value that changes in real-time such that the real-time value represents real-time data related to an entity of a contact center;

specify and store a first threshold, wherein the first threshold is related to the real-time value;

monitor the real-time value;

automatically adjust the first threshold in relation to a change in the real-time value;

automatically adjust a second threshold based on an amount of the automatic adjustment of the first threshold; and perform an action within the contact center based on the second threshold, wherein the action comprises at least one of automatically notifying a resource, invoking a recording function, and invoking a reporting function.

11. A contact center, comprising:

a plurality of network interfaces that enable an entity of the contact center to receive and service contacts, and a microprocessor in communication with the plurality of network interfaces that:

specifies a real-time value that changes in real-time such that the real-time data represents real-time data related to the entity of the contact center;

specifies and stores a first threshold, wherein the first threshold is related to the real-time value;

monitors the real-time value;

automatically adjusts the first threshold in relation to a change in the real-time value;

automatically adjusts, a second threshold based on an amount of the automatic adjustment of the first threshold; and performs an action within the contact center based on the second threshold, wherein the action comprises at least one of automatically notifying a resource, invoking a recording function, and invoking a reporting function.

12. The contact center of claim 11, wherein the microprocessor bases an amount of the automatic adjustment of the first threshold on the entity and wherein the entity is one of an agent, a queue, and a skill.

13. The contact center of claim 12, wherein the microprocessor performs an action in response to the automatic adjustment of the first threshold, wherein the entity is the agent, and wherein the action comprises the microprocessor notifying the agent of a status of the first threshold, notifying the agent of a report of the automatic adjustment in relation to a performance of the agent, and conditionally formatting a call handle time viewed by the agent.

14. The contact center of claim 12, wherein the microprocessor performs an action in response to the automatic adjustment of the first threshold, wherein the entity is an agent, and wherein the action comprises the microprocessor adding information comprising the automatic adjustment of the first threshold to a work item that is viewed by the agent and that has an altered routing based on the real-time value, and notifying the agent and a supervisor of the agent of the automatic adjustment.

15. The contact center of claim 14, wherein the notifications are automated and at about a same time as the automatic notifications, the microprocessor notifies the agent of a current status of the agent in relation to the automatic adjustment of the first threshold.

16. The contact center of claim 11, wherein the microprocessor specifies a second real-time value that is related to the real-time value and a relationship between at least two of the agent, the queue, or the skill, wherein the second real-time value changes in real-time such that it represents real-time data of a contact center, and wherein the automatic adjustment of the first threshold is related to the second real-time value.

17. The contact center of claim 11, wherein the microprocessor performs an action in response to the automatic adjustment of the first threshold, wherein the action comprises a change by the microprocessor to the behavior of the contact center and a change by the microprocessor to a requirement for a secondary automatic adjustment of the threshold based on a secondary change in the real-time value.

18. The contact center of claim 11, wherein the action comprises the invoking the recording function, and wherein the recording function comprises the microprocessor recording the automatic adjustment and the secondary automatic adjustment to the first threshold to obtain recorded data and automatically notifying an entity of the recorded data.

* * * * *